M. HINES.
EMERGENCY TIRE.
APPLICATION FILED APR. 24, 1918.
1,299,342. Patented Apr. 1, 1919.
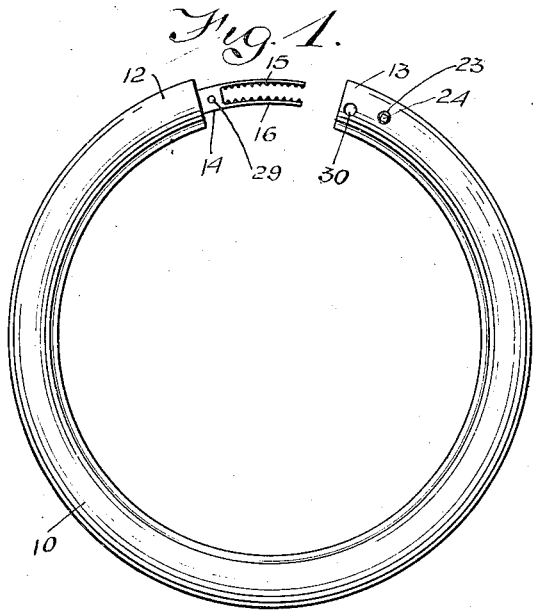
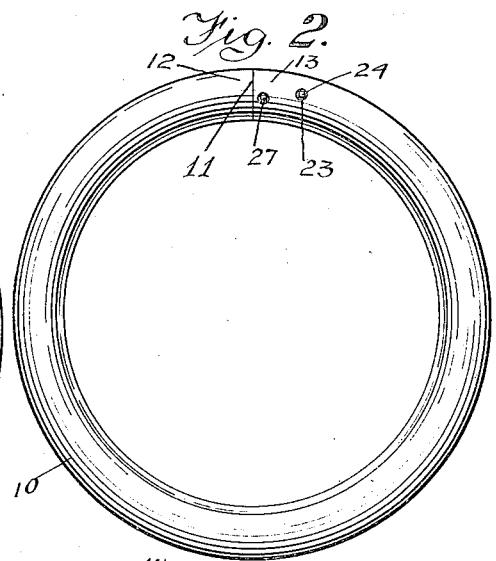
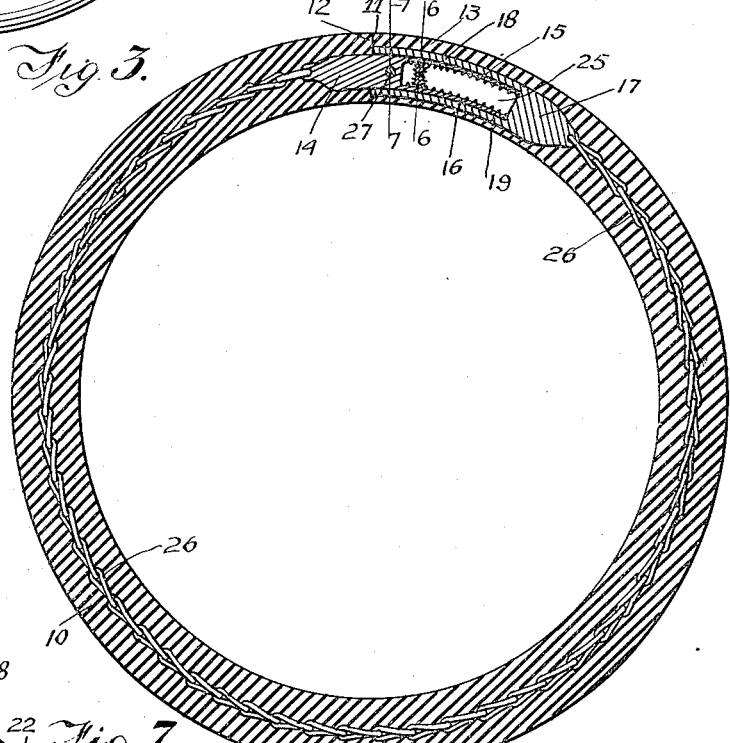
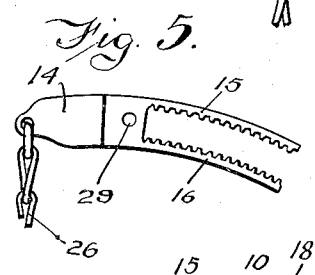
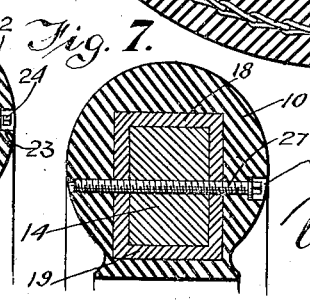
INVENTOR
Martin Hines
Victor J. Evans
ATTORNEY

UNITED STATES PATENT OFFICE.

MARTIN HINES, OF BROOKLYN, NEW YORK.

EMERGENCY-TIRE.

1,299,342.
Specification of Letters Patent.
Patented Apr. 1, 1919.

Application filed April 24, 1918. Serial No. 230,522.

*To all whom it may concern:*

Be it known that I, MARTIN HINES, a citizen of United States of America, residing at Brooklyn, in the county of Kings and State of New York, have invented new and useful Improvements in Emergency-Tires, of which the following is a specification.

This invention relates to emergency tires for automobile wheels and vehicles generally.

It has for its principal object the provision of a tire of this character which will consist of a circular tire body of cushioning material such as solid rubber or the equivalent thereof which will be properly elastic when applied to the wheel so as to absorb the shocks and jars that are transmitted thereto, the said tire being divided transversely at one point whereby the ends thereof may be adjusted relatively, and means for conveniently bringing said ends of the body together to arrange the tire in a fixed position on the wheel.

A further object of the invention resides in the formation of an emergency tire which will be capable of being readily applied to or removed from the wheel as the occasion necessitates.

A still further object of the invention is to provide a circular tire, divided transversely at one point in its circumference, and flexible metallic means embedded in the tire and adapted to hold said tire against accidental radial displacement from the rim of the wheel.

Another object of the invention is to provide an emergency tire consisting of a circular body split transversely at one point, connecting co-acting members respectively supported from said tire body at the divided ends thereof, means for adjusting one of said members over the other to bring said divided ends together, and means for positively locking said members together when the desired adjustment of the two ends of the tire body has been obtained, the said means serving also to prevent an undue application of strain to the mentioned co-acting connecting members.

In the drawings:

Figure 1, is a side view of the tire showing the ends separated.

Fig. 2, is a side view of the tire.

Fig. 3, is a vertical section through the tire showing the flexible clamping means.

Fig. 4, is a section through one of the connecting members.

Fig. 5, is a side view of the co-acting connecting member.

Fig. 6, is a transverse section on line 6—6, of Fig. 3.

Fig. 7, is a transverse section on line 7—7, of Fig. 3.

The improved emergency tire is designed principally for use in connection with vehicles employing pneumatic or similar elastic tires upon the supporting wheels. Much labor is brought about in replacing or interchanging tires at the time of blow-outs or other accidents which disable the vehicle and I have therefore designed a structure which is capable of being expeditiously applied to or removed from the wheel to replace a tire which has been blown out or otherwise affected and in carrying the invention into practice, instrumentalities are combined and arranged in the manner following, to wit:

First, I employ a suitable tire body 10, which may be constructed of solid rubber, any well-known suitable composition of matter which will be more or less elastic, or in fact any equivalent cushion which will give the desired elasticity to the vehicle. The tire body in the present instance, is of circular formation and divided radially at one point in its circumference as at 11, so that the mating ends 12 and 13, respectively can be adjusted with respect to each other for a purpose to be presently referred to. Embedded in the end 12, is a connecting member 14, which is provided with arcuate spaced rack bars 15 and 16, the same being normally extended beyond the end 12, for quite an appreciable distance. The teeth of these rack bars are arranged in opposing relation on the inner face of said bars as clearly shown in Figs. 3 and 5. They are adapted to be passed into a receiving and co-acting connecting member 17, embedded in the end 13 of the tire body. This second member has its receiving end arranged flush with the vertical edge of the end 13.

Arranged within the member 17 in spaced relation to the walls 18 and 19 thereof are meshing pinions 20 and 21, the former having a stem 22 which is extended into a socket 23 in one side of the tire body and as shown the terminal of said stem is provided with angularly disposed surfaces 24 adapted to be associated with a suitable wrench, not shown. In this manner it is manifest that on transferring motion to the stem 22, the gears or pinions 20 and 21 will be simultaneously rotated. The rack bars 15 and 16 of the member 14 are adapted to pass into the socket 25 of the member 17 so that their teeth will be brought into meshing engagement with said pinions 20 and 21 respectively. When this association of parts has been established such as when manually inserting one member within the other, the stem 22 can be rotated and in so doing the rack bars are adjusted in the socket 25 to regulate any desired relative adjustment of the two ends of the tire body.

Arranged and embedded in the tire body is a flexible clamping element 26, the same being preferably in the form of a metallic chain. This chain has its opposite ends respectively connected with the meeting connecting members 14 and 17 so that a circumferential adjustment may be made in the chain when an adjustment of the co-acting members 14 and 17 is made.

In order to prevent casual separation of the ends 12 and 13 of the tire body when the latter is in place on the rim of a wheel, I provide a removable threaded key 27, which is adapted to be threaded into receiving passages 28 in the member 17 and a similar passage 29 in the member 14. The passages 28 aline with a passage 30 at one side of the tire body to permit the key to be applied to or removed from the tire when desired. This arrangement permanently locks the ends of the tire body together.

When it is desired to use the tire the ends thereof are separated. The tire is then placed around the rim of the wheel and the ends brought together to cause the member 14 to enter the socket 25 in the member 17. The stem 22 is then adjusted to bring the ends of the tire body together and contract the body against the rim of the wheel. The flexible clamp 26 serves to cause impingement of the tire against the rim and it prevents lateral displacement of the tire from the rim while the tire is in use. Through the arrangement of the several devices as combined herein the tire may be quickly applied to or removed from the rim of a wheel. No intricate knowledge of mechanics is required in order to effect an operative application of the tire to the rim or a removal of the same therefrom.

What is claimed as new is:

1. An emergency tire comprising a circular body split transversely at one point in its circumference to provide relatively adjustable ends, a rack bar carried by one of said ends, means carried by the other end and including gearing co-acting with said rack bar, and means engaging said co-acting members to secure same against relative movement.

2. An emergency tire comprising a circular body split transversely at one point in its circumference to provide relatively adjustable ends, means carried by one of said ends, means carried by the other end and co-acting with said first means, mechanism for effecting relative adjustments of said first and second named means, and a removable device passing through one of the tire ends and engageable with said first and second named means to hold the same locked together, and a flexible element embedded in said body and having its opposite ends connected with said first and second named means respectively.

3. An emergency tire comprising a circular body split transversely at one point in its circumference to provide relatively adjustable ends, means carried by one of said ends, and including rack bars and means carried by the other end and including gearing adapted to mesh with said rack bars.

4. A tire having relatively separable ends, co-acting devices carried by said ends, means for moving said co-acting devices relatively and means engageable with said co-acting devices to hold the same locked together.

In testimony whereof I affix my signature.

MARTIN HINES.